(12) United States Patent
Daniels (10) Patent No.: US 12,129,589 B2
(45) Date of Patent: Oct. 29, 2024

(54) WASHING MACHINE WITH HOLDING TANK FOR TEMPORARILY STORING COSTLY LAUNDRY ADDITIVE

(71) Applicant: Ralph G. Daniels, Auburn, NH (US)

(72) Inventor: Ralph G. Daniels, Auburn, NH (US)

( * ) Notice: Subject to any disclaimer, the term of this patent is extended or adjusted under 35 U.S.C. 154(b) by 739 days.

(21) Appl. No.: 17/281,692

(22) PCT Filed: Oct. 2, 2019

(86) PCT No.: PCT/US2019/054199
§ 371 (c)(1),
(2) Date: Mar. 31, 2021

(87) PCT Pub. No.: WO2020/081232
PCT Pub. Date: Apr. 23, 2020

(65) Prior Publication Data
US 2022/0034019 A1    Feb. 3, 2022

Related U.S. Application Data (60) Provisional application No. 62/745,700, filed on Oct. 15, 2018.

(51) Int. Cl.
*D06F 39/00*    (2024.01)
*D06F 33/34*    (2020.01)
(Continued)

(52) U.S. Cl.
CPC ............ *D06F 39/006* (2013.01); *D06F 33/34* (2020.02); *D06F 33/37* (2020.02); *D06F 35/001* (2013.01);
(Continued)

(58) Field of Classification Search
CPC ........ D06F 33/34; D06F 33/37; D06F 35/001; D06F 39/006; D06F 39/083;
(Continued)

(56) References Cited

U.S. PATENT DOCUMENTS 3,841,116 A    10/1974    Klein et al.
5,097,556 A    3/1992    Engel et al.
(Continued)

OTHER PUBLICATIONS

International Search Report Corresponding to PCT/US2019/054199 mailed Jan. 6, 2020.

*Primary Examiner* — Joseph L. Perrin
(74) *Attorney, Agent, or Firm* — Finch & Maloney PLLC (57) ABSTRACT

A washing machine having a washed laundry/garment treatment system. The washing machine comprises a rotatable drum, a soap/laundry dispenser, a water supply flow valve, an ozone generator and a control panel for controlling operation of the rotatable drum, the soap/laundry dispenser, the water supply flow valve, and the ozone generator. The laundry/garment treatment system comprises a source of an additive/treating composition to be added a washing machine without any laundry/garments contained therein, and the source of the additive/treating composition is connected to the washing machine to supply a quantity of additive/treating composition thereto for mixing with water and formation of a treatment mixture. A circulating pump is connected to the washing machine for pumping the treatment mixture into a treatment holding tank. A mixture feed valve controls the flow of treatment mixture from the treatment holding tank back into the washing machine for treating the laundry/garments, following washing thereof.

20 Claims, 3 Drawing Sheets

(51) Int. Cl.
*D06F 33/37* (2020.01)
*D06F 35/00* (2006.01)
*D06F 39/02* (2006.01)
*D06F 39/08* (2006.01)
*C01B 13/10* (2006.01)
*D06F 23/02* (2006.01)
*D06F 39/20* (2024.01)
*D06F 59/02* (2006.01)
*D06F 93/00* (2006.01)
*D06F 95/00* (2006.01)
*D06F 103/14* (2020.01)
*D06F 105/06* (2020.01)
*D06P 5/20* (2006.01)

(52) U.S. Cl.
CPC ............ *D06F 39/02* (2013.01); *D06F 39/083* (2013.01); *D06F 39/085* (2013.01); *D06F 39/088* (2013.01); *C01B 13/10* (2013.01); *D06F 23/025* (2013.01); *D06F 39/20* (2024.01); *D06F 59/02* (2013.01); *D06F 93/005* (2013.01); *D06F 95/00* (2013.01); *D06F 2103/14* (2020.02); *D06F 2105/06* (2020.02); *D06P 5/2005* (2013.01)

(58) Field of Classification Search
CPC ...... D06F 39/085; D06F 39/088; D06F 39/20; D06F 2103/14; D06F 2105/06
See application file for complete search history.

(56) References Cited

U.S. PATENT DOCUMENTS

| | | | |
|---|---|---|---|
| 5,241,720 A | 9/1993 | Engel et al. | |
| 5,313,811 A | 5/1994 | Wasinger et al. | |
| 5,493,743 A * | 2/1996 | Schneider | C02F 1/78 68/183 |
| 5,876,461 A | 3/1999 | Racette et al. | |
| 5,960,649 A | 10/1999 | Burdick | |
| 6,506,309 B1 | 1/2003 | Daniels et al. | |
| 2005/0183208 A1 | 8/2005 | Scheper et al. | |
| 2008/0092601 A1 | 4/2008 | Konides et al. | |
| 2014/0033445 A1 | 2/2014 | Daniels et al. | |

* cited by examiner

WASHING MACHINE WITH HOLDING TANK FOR TEMPORARILY STORING COSTLY LAUNDRY ADDITIVE

FIELD OF THE INVENTION

The present invention relates to an improved washing machine system for adding, mixing, temporarily storing and reusing relatively expensive laundry/garment treatments and/or additives to minimize the associate costs of adding expensive treatments and/or additives to washed laundry/garments and thereby increase the overall efficiency of the washing and treating process.

BACKGROUND OF THE INVENTION

The use of ozone in cleaning and sanitizing laundry/garments has been utilized for quite some time. The primary reason is that ozone is generally recognized as being effective in cleaning as well as deodorizing and sanitizing laundry/garments while also minimizing impact to the environment. With respect to commercial applications, however, ozone is generally the preferred cleaning component as it is relatively inexpensive to manufacture and quite reliable in deodorizing and sanitizing laundry.

As is well known, the application of ozone to a cleaning fluid, such as water, acts as a disinfectant as well as assists with removing dirt, debris and other contaminants from the laundry detergent so that the laundry detergent can again be effective in removing additional dirt, debris and other contaminants from the clothing or other laundry being laundered. While it is known that dissolving ozone in a liquid, such as water, will assist with improving the cleaning and sterilization efficiency of the liquid, a number of the currently available prior art systems suffer a variety of associated drawbacks. In particular, a portion of the ozone which is added to the liquid does not become completely dissolved within the water so that such ozone cannot readily directly contact any substance(s) dissolved or contained within the wash water. As a result, the undissolved ozone is rapidly given off, dissipated and/or evaporated from the liquid (wash water) as soon as the liquid enters into a reservoir, e.g., contact chamber, or some other expansion chamber, for example. As a result, such undissolved ozone is not effective in cleaning and/or disinfecting the laundry and thus not all of the ozone, which is added to the liquid or water, is active or effective in achieving the desired cleaning and/or sterilization of the laundry intended by the ozonated liquid. Further, many times, some of the replacement liquid or wash water, which is added to the washing machine during one or more of the wash cycles or stages, does not contain any ozone and such unozonated liquid generally increases the duration of the cleaning, sanitization and/or disinfection time for the laundry being washed.

It is to be appreciated that washing laundry can be a relatively expensive process. It utilizes costly resources—water, energy, detergents and labor—and such laundering is often required not only to clean but completely disinfect and sanitize the laundry items. While conventional detergents and soap can be effective in removing dirt, grease, grime and other contaminants, they are not always effective in killing all of the germs and bacteria contained within the laundry. It is known to enhance the disinfection capabilities of a washing machine by introducing ozone into the washing water. The ozone improves cleaning of laundry, even at relatively low or cold wash water temperatures, and also has an antibacterial effect.

Previous systems for introducing ozone have included a simple bubble system in which ozone is bubbled through water in a washing machine drum. The efficiency of dissolving ozone in the water of such apparatus is somewhat low, and the concentration of dissolved ozone in the water is consequently low thereby resulting in only a minor enhancement in the cleaning and the antibacterial effect of the ozone. There is also the disadvantage that the amount of off-gas, i.e., the ozone which is readily given off and dissipated into the surrounding environment, from the wash water both during filling and/or during operation of the washing machine, can be considerable. The ozone gas will typically collect in the area surrounding one or more sampling ports, exhaust vents or some other outlet of the washing machine and can potentially cause health and/or safety problems in the event that any person, located adjacent or within the room accommodating the washing machine(s), is exposed to a high concentration of ozone.

In order to improve the efficiency with which ozone is dissolved in the wash water, systems using venturis have been developed. Such systems attempt to forcibly dissolve ozone in the water and thereby increase the concentration of dissolved ozone within the liquid or wash water as a fresh water is added to the washing machine. However, the ozone is generally not completely and thoroughly mixed and dissolved within the water, so as to maximize contact of the dissolved ozone during the washing process and such ozone tends to dissolve out of solution fairly rapidly and become gaseous shortly after being mixed with the water and supplied to the washing machine.

For some applications, it is desirable to treat the washed laundry/garments with an additive and/or treatment composition to facilitate subsequent processing of the washed laundry/garments. Often times, such additives and/or treatment compositions are quite expensive to utilize. Due to such expense, typically only a certain area or areas of the washed laundry/garment is treated with the expensive additive and/or treatment composition. However, such selective treatment of one or more selective areas of the washed laundry/garment tends to be fairly time-consuming and laborious.

SUMMARY OF THE INVENTION

Wherefore, it is an object of the present invention to overcome the above mentioned shortcomings and drawbacks associated with the prior art.

Another object of the present invention is to utilize the internal rotatable drum of the washing machine to facilitate mixing/dilution of the treatment and/or additive with water prior to temporarily storing the treatment mixture in the treatment holding tank for subsequent treatment of washed laundry/garments.

A further object of the present invention is to control the flow of the additive and/or treatment composition into the washing chamber of the washing machine containing the rotatable drum so the precise volume of the additive and/or treatment composition is known and can be mixed with a precise volume of a diluting fluid, such as water, which is also supplied to the washing chamber of the washing machine so that a precise amount of the diluting fluid is also known to thereby properly dilute the additive or treatment composition, as required.

Yet another object of the present invention is to utilize a circulating wash water flow path which pumps wash water from the wash chamber, during a wash cycle, through a venturi, which assists with drawing in ozone into the wash water, before the ozone and wash water combination then pass through a static mixer which ensures sufficient contact time of the ozone with the wash water as well as intimate mixing of the ozone with the wash water. The ozone in combination with the soap/laundry detergent ensures that the laundry/garments is/are sufficiently cleaned and all excess oils, color, dyes, etc., contained on the laundry/garments, are effectively neutralized or oxidizing during the washing cycles of the washing machine.

A still further object of the present invention is to supply an excess quantity of the properly diluted additive and/or treatment, i.e., the treatment fluid, back to the treatment holding tank, for subsequent use, and return any unused treatment fluid back into the holding tank, once the laundry/garments has been sufficiently treated with the same, to facilitate reuse of the treatment fluid for at least one additional use, and preferably facilitate reuse of the treatment fluid at least two or more additional times.

As used in the appended claims, the term the "control panel" is intended to include the functions controlled by both the washing machine control panel as well as the system control panel. It is to be appreciated that various functions can be controlled by either one of the control panels or by a single control panel without departing from the spirit and scope of the disclosure.

The present invention also relates to a washing machine comprising: a rotatable drum being located within a wash chamber for containing laundry/garments to be washed; a soap/laundry detergent dispenser for dispensing soap/laundry detergent into the wash chamber for washing the laundry/garments; a water supply flow valve for controlling a flow of water from a water supply to the wash chamber for washing the laundry/garments; an ozone generator for supplying ozone to the water to assist with cleaning the laundry/garments; and a control panel for controlling operation of at least the rotatable drum, the soap/laundry detergent dispenser, the water supply flow valve, and the ozone generator; wherein the washing machine further comprises a laundry/garment treatment system which comprises: an additive/treating composition supply line, for connection with a source of an additive/treating composition to be added to the washing machine and supplying the additive/treating composition to the washing machine, without any laundry/garments contained within the washing machine, and the additive/treating composition, follow supplying thereof to the washing machine, being diluted and mixed with water to form of a treatment mixture; a circulating pump being connected to the washing machine for pumping the treatment mixture into a treatment holding tank for temporary storage; and a mixture feed valve being connected to the treatment holding tank for controlling a flow of the treatment mixture, following washing of the laundry/garments, from the treatment holding tank back into the washing machine for treating the washed laundry/garments.

The present invention also relates to a method of treated washed laundry/garments with a treatment mixture, the method comprising: providing a wash chamber, containing a rotatable drum, for washing the laundry/garments to be washed; providing a soap/laundry dispenser for dispensing soap/laundry detergent into the wash chamber for washing the laundry/garments to be washed; connecting a water supply flow valve to the wash chamber for controlling flow of water from a water supply source thereto; connecting an ozone generator to the washing machine for supplying ozone thereto, during operation of the washing machine; controlling operation of at least the rotatable drum, the soap/laundry dispenser, the water supply flow valve, and the ozone generator via a control panel; connecting an additive/treating composition supply line to a source of an additive/treating composition to be added to the washing machine and supplying the additive/treating composition to the washing machine, without any laundry/garments being contained within the washing machine; diluting and mixing the additive/treating composition with water to form of a treatment mixture; pumping the treatment mixture from the washing machine into a treatment holding tank for temporary storage; following washing of the laundry/garments, supplying the treatment mixture from the treatment holding tank to the washing machine to treat the washed laundry/garments; and following treatment of the washed laundry/garments with the treatment mixture, pumping any remaining treatment mixture from the washing machine back into the treatment holding tank for temporary storage and subsequent reuse.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
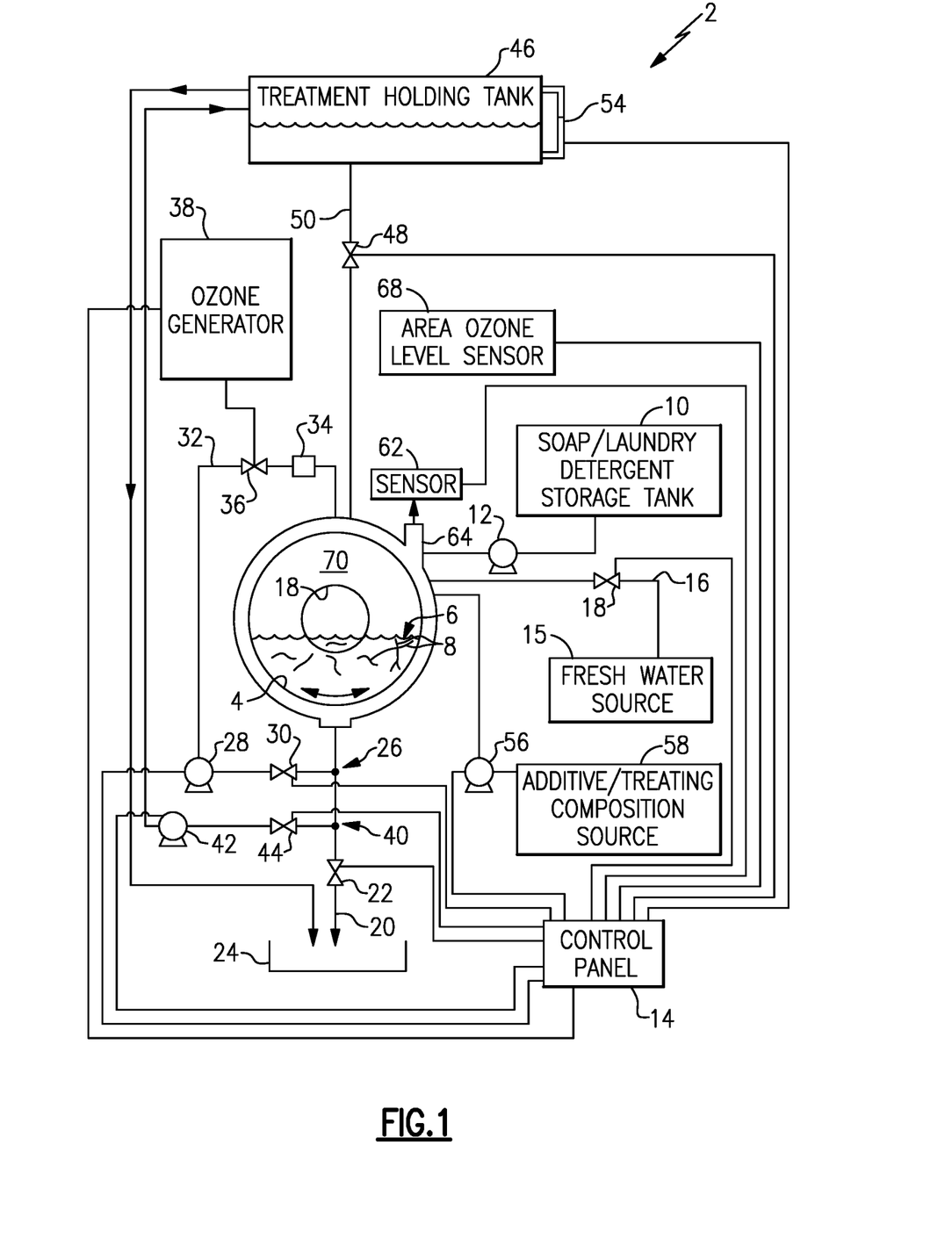
FIG. 1 is a diagrammatic view showing the various components of the improved washing machine system for adding, mixing, temporarily storing and reusing treatments and/or additives for laundry/garments, according to the disclosure.

Turning now to FIG. 1, a brief description concerning the various components of the present invention will now be briefly discussed. As can be seen in this embodiment, the present invention relates to a washing machine 2 which includes a rotatable drum 4, contained within an internal wash chamber 6, which facilitate washing of the desired laundry/garments 8 to be washed and/or treated. A conventional (e.g., a top or a front load) door (not shown) is provided to facilitate access to the rotatable drum 4 located within the wash chamber 6 and assist with both loading and unloading of laundry/garments 8 in the washing machine 2.

As is conventional in the art, an automated soap/laundry detergent dispenser is provided for dispensing a desired quantity of the soap/laundry detergent (not shown in detail) into the washing machine 2 for cleaning and sanitizing the laundry/garments 8 being washed. The automated soap/laundry detergent dispenser includes a soap/laundry detergent storage tank 10 and a soap/laundry detergent dispensing pump 12 which is electrically coupled to a control panel 14, e.g., a washing machine control panel, which includes a computer or CPU, to facilitate automated control of the various functions of the washing machine 2, including automated dispensing of the soap/laundry detergent into the washing machine 2, when required.

As is conventional in the art, a supply line 16, from a fresh water source 15, is connected to the washing machine 2 to facilitate adding fresh water to the washing machine 2, as desired, during the various wash/rinse cycles. A fresh water flow valve 18 is located along the fresh water supply line 16 to control the flow of water being supplied to the washing machine 2. The fresh water flow valve 18 is electrically coupled to the control panel 14, e.g., the washing machine control panel, to facilitate automated control of the fresh water flowing into the washing machine 2. The wash chamber 6 of the washing machine 2 has a plurality of different water filling levels, e.g., typically up to 30 or more different water filling levels, which can be automatically selected by the control panel 14.

As is also conventional in the art, a drainage line 20 is connected to a lower most region of the washing machine 2, e.g., typically a sump, to facilitate removing wash water, spent soap/laundry detergent, contaminants, debris, etc., from the washing machine 2, after completion of the wash cycle and during the rinse cycle(s). A drainage flow valve 22 is located along the drainage line 20 to control the flow of the wash water, the spent soap/laundry detergent, the contaminants, the debris, etc., from the washing machine 2 along the drainage line 20 and conveying the same to a conventional drainage system 24, such as a public wastewater system, a septic system, or some other water treatment system or facility. The drainage flow valve 22 is electrically coupled to the control panel 14, e.g., the washing machine control panel, to facilitate automated control of the flow of the wash water, the spent soap/laundry detergent, the contaminants, the debris, etc., from the washing machine 2.

A first T-connection 26 is located along the drainage line 20, before the drainage flow valve 22, and an outlet of the first T-connection 26 is coupled to an inlet of a system circulating pump 28. An outlet of the circulating pump 28 conveys the pumped fluid, e.g., a mixture of water, soap/laundry detergent and ozone, along a fluid return line back toward the washing machine 2 while a circulating pump flow valve 30 controls the flow of fluid from the fluid return line back to the washing machine 2. Both the system circulating pump 28 and the circulating pump flow valve 30 are electrically coupled to the control panel 14, e.g., the washing machine control panel, to facilitate automated control thereof. When the system circulating pump 28 is operating and the circulating pump flow valve 30 is open, the circulating pump 28 removes fluid from the lower region of the washing machine 2, e.g., the sump, and returns the pumped fluid back, via the fluid return line 32, to an upper region of the washing machine 2 to facilitate circulating and mixing of the fluid which is contained within the washing machine 2, and the purpose and function of such circulation will become apparent from the following description.

As shown, a static mixer 34 is located along the fluid return line 32 in order to assist with mixing of the fluid flowing along the fluid return line 32. The static mixer 34 normally has a length of between a few inches and 5 feet, typically about 3 feet. As is conventional in the art, the static mixer 34 achieves sufficient mixing of the fluid passing therethrough and along the fluid return line 32 without requiring any moving components.

A venturi 36 is located along the fluid return line, typically immediately before and upstream of the static mixer 34. A throat of the venturi 36 is connected to a source of ozone or an ozone generator 38 in order to supply ozone to the fluid which is pumped through the venturi 36. As the fluid flows through the venturi 36, such flow induces the ozone to be drawn or sucked into the fluid flowing through the venturi 36 and commence mixing of the drawn in ozone with the fluid. By positioning the static mixer 34 immediately after the venturi 36, the static mixer 34 facilitates a complete and through mixing of the ozone with the fluid which is pumped through the venturi 36.

Typically, the ozone generator 38 will be constantly and continuously producing ozone, during the entire operating cycle of the washing machine 2, i.e., during all of the wash as well as the rinse cycles of the washing machine. The produced ozone is normally retained within the ozone generator 38 and the ozone is only withdrawn therefrom when necessary or required, e.g., as fluid flows through the venturi 36 and sucks or draws out ozone from the ozone generator 38 into the pumped fluid. That is, as the fluid flows through the venturi 36, the fluid creates a vacuum within the venturi 36 and such vacuum, in turn, sucks or draws a desired quantity of the produced ozone, from the ozone generator 38, into the pumped fluid. The ozone generator 38 is electrically connected to the control panel 14, e.g., the system control panel, to facilitate both control and operation of the ozone generator 38 as well as facilitate interruption of the production of ozone in the event that a hazardous condition arises.

A second T-connection 40 is located along the drainage line 20, typically at a located between the first T-connection 26 and the drainage flow valve 22, and an outlet from the second T-connection 40 is coupled to an inlet of a storage pump 42. A holding tank supply valve 44 is located between the second T-connection 40 and the storage pump 42. An outlet from the storage pump 42 is connected to an inlet of a treatment holding tank 46. The treatment holding tank 46 is typically located at a height vertically above the height of the washing machine 2, e.g., at least a few feet above the washing machine 2. The storage pump 42 conveys the pumped fluid into the treatment holding tank 46 for temporary storage and subsequent use. Since the treatment holding tank 46 is located vertically above the washing machine 2, the temporarily stored fluid can then be feed, via gravity, back into the washing machine 2 when desired or required by the washing machine 2, e.g., after the laundry/garments 8 have been washed to treat the same. A mixture feed valve 48 is located along the mixture feed line 50, between the treatment holding tank 46 and the washing machine 2, to control the flow of the fluid from the treatment holding tank 46 into the washing machine 2. The holding tank supply valve 44, the storage pump 42 and the mixture feed valve 48 are all electrically coupled to the control panel 14, e.g., the system control panel, to facilitate automated control thereof. These components, along with an additive/treating composition pump 56 (discussed below), form part of a novel treatment system 64 of the present invention. When the holding tank supply valve 44 is open and the mixture feed valve 48 is closed, and the storage pump 42 is operated, the fluid contained within the washing machine 2 is fed into the treatment holding tank 46 for temporary storage and subsequent use.

The treatment holding tank 46 is designed to hold a desired quantity of a desired fluid, e.g., typically between 10 gallons and 50 gallons of fluid or more, but more preferably about 20 to 30 gallons of fluid. The treatment holding tank 46 is generally a sealed container, but is provided with an overflow outlet 52 which permits any excess fluid, which is supplied to the treatment holding tank 46, to escape and flow out of the treatment holding tank 46 into a fluid overflow conduit which is connected with the drainage system 24 so as to avoid over filling or over pressurization of the treatment holding tank 46.

The treatment holding tank 46 is typically provided with a fluid level indicator 54 which indicates the current level of fluid which is contained within the treatment holding tank 46. The fluid level indicator 54 may be, for example, simply a visual or sight indicator, such a piece of glass or plastic which facilitates viewing inside the treatment holding tank 46, a piece of clear tubing connected to the treatment holding tank 46 so as to indicate the current height of the fluid contained within the treatment holding tank 46, or may possibly be an internal float valve which floats on the top surface of the fluid contained within the treatment holding tank 46 and thereby indicates the fluid level, or possibly merely a low fluid level sensor which indicates when the fluid level in the treatment holding tank 46 is sufficiently low to fill the washing machine 2 with the treatment mixture is in need of replenishment. In the event that the fluid level indicator 54 is an electrical sensor, then any output from this sensor is typically feed to the system control panel (not shown in detail), which also includes a computer, to facilitate automated refilling of the treatment holding tank 46 with additional fluid, when the volume of the treatment fluid contained therein is low, as will be discussed below in further detail.

An additive/treating composition source 58, to be added to the laundry/garments 8, is connected, via an additive/treating composition supply line 60, to the washing machine 2. An additive/treating composition pump 56 is located along the additive/treating composition supply line 60 to control the flow of the additive/treating composition from the source of the additive/treating composition 58 to the washing machine 2. The additive/treating composition pump 56 is designed to pump a desired quantity/volume of the additive/treating composition into the washing machine 2 so as to precisely control dilution of the additive/treating composition with another fluid, typically water. In addition, as noted above, the supply of fresh water is also connected to the washing machine 2 via the fresh water supply line 16. The water supply valve 18 controls the flow the fresh water into the washing machine 2 to assist with diluting the additive/treating composition supplied to the washing machine 2.

As noted above, the wash chamber 6 of the washing machine 2 typically has a plurality of different water filling levels, and one of the different filling levels can be automatically selected, by the control panel 14, e.g., either the system control panel or the washing machine control panel, in order to fill the washing machine 2 with a desired amount of water to precisely dilute the additive/treating composition currently contained within the washing machine 2. The additive/treating composition pump 56 is electrically coupled to the control panel 14, e.g., the system control panel, to facilitate automated control of the entire system.

The washing machine is equipped with an ozone exhaust or sampling sensor 62 which detects the amount of ozone either contained within the washing machine 2, or locate in or adjacent an exhaust outlet of the washing machine 2. As is typical, ozone will last anywhere between about 2 to about 20 minutes or so, e.g., typically lasting between 3 and 5 minutes, before the ozone naturally converts back into oxygen. In the event that the ozone exhaust or sampling sensor 62 detects an excessive amount of ozone, e.g., an amount of ozone greater than the adjusted sensitivity position of the ozone exhaust or sampling sensor 62 (e.g., the ozone exhaust or sampling sensor 62 is typically set to detect from about 0.3 to about 1.0 parts per million of ozone, for instance), will send a signal to the control panel 14, e.g., either the system control panel or the washing machine control panel, which, in turn, prompts a slow down or interrupt further production of ozone. As soon as the ozone exhaust or sampling sensor 62 detects an ozone level less than a desired value, then the ozone exhaust or sampling sensor 62 will then discontinue sending a signal to the control panel 14, e.g., either the washing machine control panel or the system control panel. Thereafter, the ozone generator 38 will commence further production and supply of ozone to the washing machine 2. The sensitivity setting for the area ozone level sensor 68 is also typically adjustable but typically has a sensitivity range of between about 0.03 to about 0.1 parts per million or greater, for example.

In addition, the system 2 is also equipped with an area ozone level detector or sensor 68 which monitors the level of the ozone contained within a room or an area accommodating the washing machine 4, e.g., a commercial washing facility. In the event that the area ozone level sensor 68 detects an excessively high or unsafe amount of ozone located within the room or the area accommodating the at least one washing machine 4, e.g., detects a room concentration level of ozone also above the ozone target value or some other common area target value, which is also currently typically in excess of 0.1 parts per million, then the area ozone level sensor 68 will then convey a signal to the control panel 14, e.g., either the washing machine control panel or the system control panel, which thereafter "trips" or interrupt further production of ozone, or possibly decreases or reduces the rate of production of ozone by the ozone generator 38 for a sufficient period of time, e.g., any where from a few seconds to about thirty minutes or so until the area ozone level sensor 68 again detects a level of ozone in the room or the area accommodating the washing machine 4 is below a desired value. The sensitivity setting for the area ozone level sensor 68 is also typically adjustable but typically has a sensitivity range of between about 0.03 to about 0.1 parts per million or greater, for example.

Supplying/Replenishing Treatment Mixture to the Holding Tank Operation

The following description is provided concerning the initial filling of the treatment holding tank 46 with the treatment mixture at the beginning of usage, or refilling the treatment holding tank 46 when the volume of the treatment mixture contained therein is sufficiently low and requires replenishment. First, the control panel 14 will activate the additive/treating composition pump 56 to supply a desired quantity/volume of the desired additive/treating composition into wash chamber 6 of the washing machine 2. The control panel 14 will also activate the fresh water flow valve 18 to supply a desired quantity/volume of water into the wash chamber 6 of the washing machine 2 to precisely dilute the additive/treating composition. It is to be appreciated that the additive/treating composition pump 56 and the fresh water flow valve 18 can either be activated simultaneously with one another or sequentially one after the other. Once precise quantities/volumes of supplied additive/treating composition and the fresh water are added to the washing machine 2 so as to obtain the specific dilution ratio of the additive/treating composition, then the control panel 14 will deactivate both the additive/treating composition pump 56 and the fresh water flow valve 18.

Thereafter, the control panel 14 will then activate the rotatable drum 4 to agitate and mix the additive/treating composition with the fresh water. This mixing process continues for a desired period of time so as to thoroughly mix the additive/treating composition with the fresh water and thereby form a homogeneous mixture thereof, e.g., a treatment mixture. It is to be appreciated that mixing process may last, for example, between about 0.2 to 5 minutes or so. Once the homogeneous treatment mixture is achieved, then the control panel 14 will then deactivate the rotatable drum 4.

Next, the control panel 14 will open the holding tank supply valve 44 and activate the storage pump 42 in order to pump the homogeneous treatment mixture from the washing machine 2 into the treatment holding tank 46 for temporary storage and subsequent use, as described below in further detail. When all of the homogeneous treatment mixture is pumped from the washing machine 2 into the treatment holding tank 46, then the control panel 14 will close the holding tank supply valve 44 and deactivate the storage pump 42. Thereafter, the treatment holding tank 46 contains the treatment mixture which can then be feed, via gravity, back into the washing machine 2 when desired or required by the control panel 14 by opening the mixture feed valve 48 so that the treatment fluid can flow from the treatment holding tank 46 into the washing machine 2 and treat the washed laundry/garments 8, as described below in further detail.

It is to be appreciated that once a sufficient amount of the treatment mixture is depleted from the treatment holding tank 46, i.e., utilized to treat the washed laundry/garments 8, then the above process is repeated, without any laundry/garments 8 being contained within the washing machine 2, in order to replenish the supply of the homogeneous treatment mixture of the additive/treating composition/fresh water which is contained within the treatment holding tank 46.

Washing Operation

Once the treatment holding tank 46 contains a sufficient amount of the homogeneous mixture of the treatment mixture, the washing machine 2 is then ready for use. An operator will then open the door and place the desired laundry/garments 8, e.g., newly dyed 100% polyester T-shirts, in the rotatable drum 4 of the washing machine 2 in order to wash and clean the laundry/garments 8, e.g., to remove any oils, remaining dye therefrom, etc. The control panel 14 will then control operation of the washing machine 2 to wash the laundry/garments 8 in a conventional manner. That is, a desired quantity of fresh water, via the fresh water flow valve 18, as well as a suitable amount of the soap/laundry detergent will be automatically dispensed into the washing machine 2 by the dispensing pump 12. In addition, the control panel 14, e.g., either the system control panel or the washing machine control panel, will commence oscillation of the rotatable drum 4, to and fro in a conventional manner, during each wash cycle.

During each wash cycle, the control panel 14, e.g., either the system control panel or the washing machine control panel, will then open the circulating pump flow valve 30 and activate both the ozone generator 38 and the circulating pump 28. Upon activation, the circulating pump 28 commences pumping some of the wash water or fluid, contained within the lower region, e.g., sump, of the washing machine 2, and pumps that fluid through the venturi 36 and the static mixer 34 before the pumped fluid is returned back to an upper region of the washing machine 2. As the water is pumped through the venturi 36, such flow of pumped water induces the ozone, from the ozone generator 38, to be sucked into the flowing fluid and commence mixing of the ozone with the fluid. Further mixing of the ozone with the pumped fluid occurs as the ozone and the fluid flow through the static mixer 34 so that, upon exiting from the static mixer 34, the ozone is intimately mixed and dispersed throughout the pumped fluid. The fluid, having the ozone intimately mixed and dispersed therethrough, is then conveyed back into the washing machine 2 to assist with further cleaning and sanitation of the laundry/garments 8 in a conventional manner.

Following completion of the wash cycle, the control panel 14, e.g., either the system control panel or the washing machine control panel, will then typically control the washing machine 2 to complete one or more rinse cycles of the laundry/garments 8. During each rinse cycle, the drainage flow valve 22, connected to the drainage line 20, is opened so as to drain and remove the supplied fresh water, the wash water, the spent soap/laundry detergent, the contaminants, the debris, etc., from the washing machine 2. Following completion of each rinse cycle, the control panel 14, e.g., either the system control panel or the washing machine control panel, will then close the drainage flow valve 22.

In order to ensure that the washed laundry/garments 8 is/are is as dry as reasonably possible, the rotatable drum 4 may rotate for a prolonged period of time, at a relatively high rotational speed, without any fresh water be added to the washed laundry/garments 8. Such a high speed spin cycle removes as much liquid as possible from the washed laundry/garments 8. In addition or alternatively, the washing machine 2 may be equipped with a drying component or feature (not shown in detail) which facilitates at least partial drying the washed laundry/garments 8 contained within the washing machine 2 in order to further reduce the moisture content of the washed laundry/garments 8.

Treatment Operation

Once the washed laundry/garments 8 is/are sufficiently cleaned and the remaining moisture content is suitably reduced, the washed and cleaned laundry/garments 8 is/are now suitable to be coated or treated with the treatment mixture, e.g., a desired as additive/treatment composition such as Firebird(r). During this treatment process, the control panel 14, e.g., either the system control panel or the washing machine control panel, will then close the drainage flow valve 22, in the event that this valve is still open. Next, the control panel 14, typically the system control panel, will then open the mixture feed valve 48, which is located along the mixture feed line, between the treatment holding tank 46 and the washing machine 2, to initiate the flow of the treatment mixture, via gravity, from the treatment holding tank 46 into the washing machine 2. The control panel 14, typically the system control panel, maintains the mixture feed valve 48 in an open position until a sufficient quantity (e.g., 2-7 gallons or so) of the treatment mixture flows from the treatment holding tank 46 into the washing machine 2. Once a sufficient quantity of the treatment mixture flows from the treatment holding tank 46 into the washing machine 2, then the control panel 14 closes the mixture feed valve 48.

Next, the control panel 14, e.g., either the system control panel or the washing machine control panel, then activate the rotatable drum 4 to mix or gently agitate the washed laundry/garments 8 with the supplied treatment mixture so as to ensure that a through coating of the treatment mixture is applied to each one of the washed laundry/garments 8. Once all of the washed laundry/garments 8 is/are thoroughly and uniformly coated with the treatment mixture, then the control panel 14, e.g., either the system control panel or the washing machine control panel, deactivates the rotatable drum 4, closes the mixture feed valve 48 (if this valve is still open), opens the holding tank supply valve 44, and actuates the storage pump 42. The storage pump 42 then pumps any of the remaining treatment mixture contained within the washing machine 2 back into the treatment holding tank 46 for temporary storage and subsequent reuse. Thereafter, the control panel 14, e.g., either the system control panel or the washing machine control panel, then closes the holding tank supply valve 44 and deactivates the storage pump 42.

Drying Operation

Figure 2:
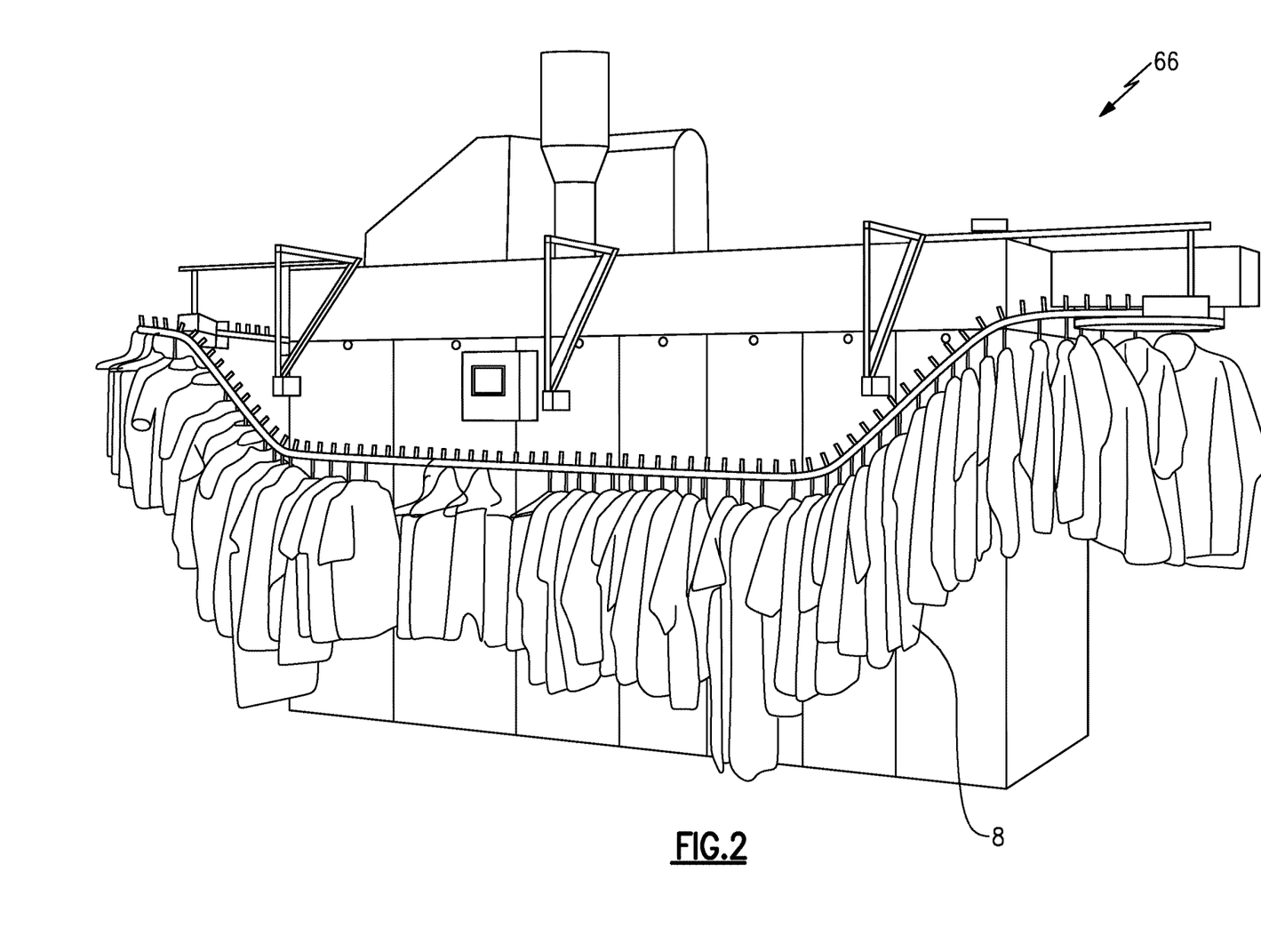
FIG. 2 is a diagrammatic view showing a tunnel drier for curing the treatment applied to the wash laundry/garments.

Next, the coated laundry/garments 8 is/are removed from the washing machine 2 and suitably dry in a conventional manner, e.g., placed in a conventional drier or preferably dried in a tunnel drier 66, as diagrammatically shown in FIG. 2. One suitable tunnel dryer is supplied by Colmac Industries of Colville, WA 99114 as model number CFS Series Wide Body Boilerless. The heat (typically between 230° F. and 280° F.) is utilized to cure the resin/coating which was just applied to the wash laundry/garments 8. It is to be appreciated that, depending upon the kind of the treatment mixture being utilized to coat/treat the washed laundry/garments 8, the treatment mixture may possibly become tacky during the drying process and thus may possibly stick to an inner surface of the dryer or the washing machine 2, if the washing machine 2 is equipped with a drying feature. Accordingly, as noted above, it may be desirable to utilize a tunnel drier 66 (only diagrammatically shown) in which the "wet" laundry/garments 8 enter an inlet end of the tunnel drier 66 and are dried as the laundry/garments 8 pass completely through the tunnel drier 66 and exit from an outlet end thereof.

Each piece of the washed and treated laundry/garments 8 is typically placed on a hanger, or the like, and then the hanger, carrying the laundry/garment 8, is coupled to a movable conveyer and transported by the movable conveyor, at a relatively slow speed, through the tunnel drier 66 to achieve the desired drying/curing. Thereafter, the treated and cured laundry/garment 8 is removed from the associated hanger. Once the coated or treated laundry/garments 8 are sufficiently cured, then the treated and cured laundry/garments 8 is/are suitable for a subsequent process, e.g., laser printing.

The above Washing Operation is then repeated for another load of laundry/garments 8. This washed load of laundry/garments 8 is then followed by the Treatment Operation where the washed laundry/garments 8 is/are then treated with the treatment mixture, as described above. Finally, the treated laundry/garments are then dried, as described above in the Drying Operation.

In addition, in the event the amount of the treatment mixture contained in the treatment holding tank 46 is determined to be insufficient, then the process of Supplying/Replenishing Treatment Mixture to the Holding Tank Operation is repeated in order to replenish the supply of the treatment mixture. The above process is periodically repeated numerous times each day to wash laundry/garments 8 and thereby conserve and facilitate repeat usage of the treatment fluid.

It is to be appreciated that since the washed laundry/garments 8 to be treated may still contain a small percentage of liquid or water, e.g., 10 to 25% by weight, it may be desirable, in some instances, to increase the concentration of the additive/treating composition relative to the fresh water so as to provide a slightly stronger concentration of the homogeneous treatment mixture. This slightly stronger concentration of the homogeneous treatment mixture is then periodically diluted each time that the homogeneous treatment mixture is utilized to treat washed laundry/garments 8 and, thereafter, pumped back into the treatment holding tank 46 for temporary storage.

Depending upon the type of additive/treating composition which is utilized to treat/coat the washed laundry/garments 8, it may be necessary to completely drain and adequately flush out at least the washing machine 2, the circulating pump flow valve 30, the circulating pump 28, the treatment holding tank 46, and the mixture feed valve 48, including the associated supply line and drainage line 20 of the washing machine 2, at the end of each day or at the end of each work shift in order to prevent hardening or solidification of the same in the event that the system is not operating for a prolonged period of time.

Figure 3:
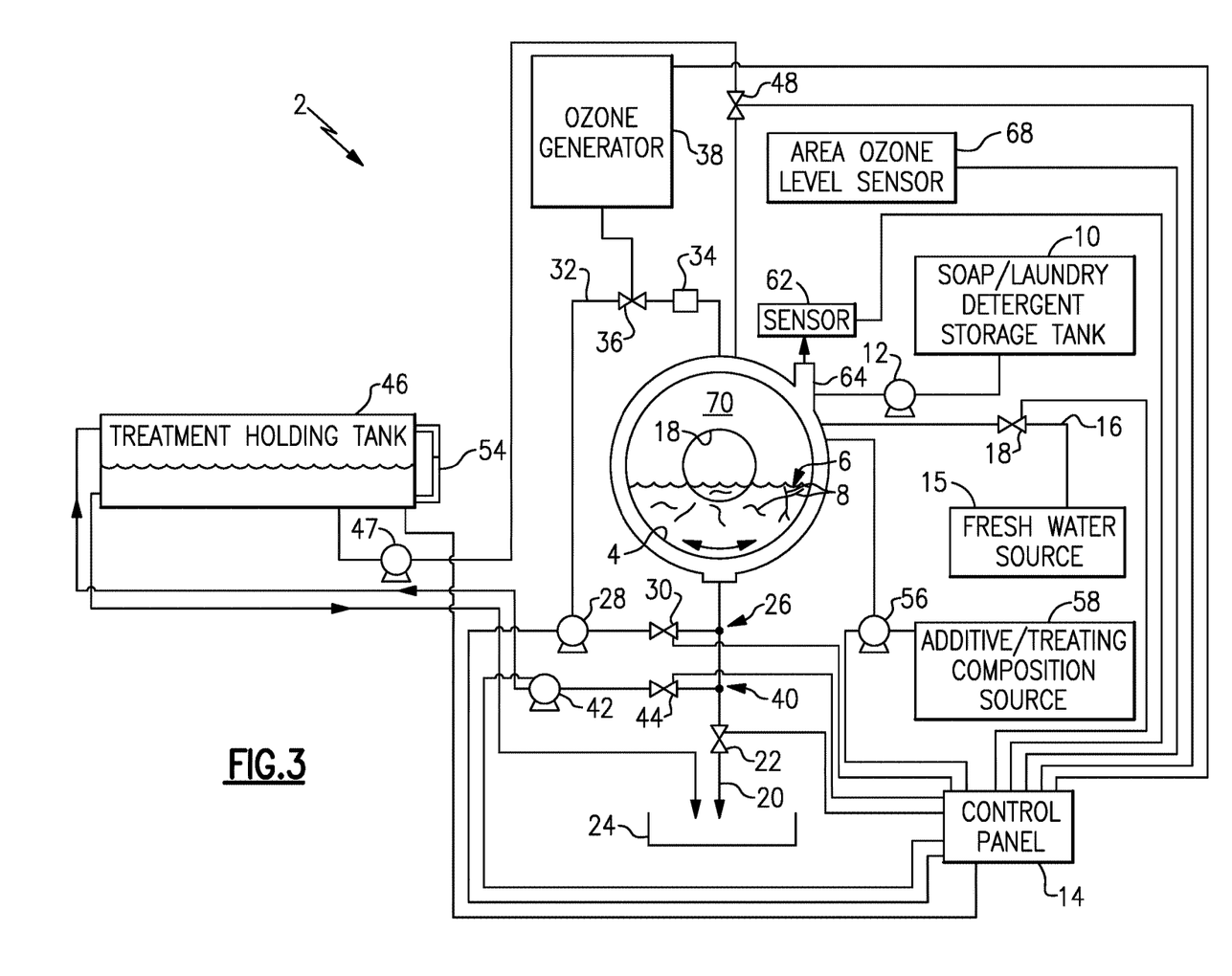
FIG. 3 is a diagrammatic view showing the various components of the improved washing machine system for adding, mixing, temporarily storing and reusing treatments and/or additives for laundry/garments, according to another embodiment.

It is to be appreciated that the treatment holding tank 46 may be located at the same level or vertically below the height of the washing machine 2, as shown in FIG. 3. According to this embodiment, the storage pump 42 conveys the pumped fluid into the treatment holding tank 46 for temporary storage and subsequent use. Since the treatment holding tank 46 is located at or vertically below the washing machine 2, the temporarily stored fluid must be feed, via a holding tank dispensing pump 47, back into the washing machine 2 when desired or required by the washing machine 2, e.g., after the laundry/garments 8 have been washed to treat the same. A mixture feed valve 48 is located along the mixture feed line 50, between the treatment holding tank 46 and the washing machine 2, to control the flow of the fluid pumped by the holding tank dispensing pump 47 from the treatment holding tank 46 into the washing machine 2. The holding tank supply valve 44, the storage pump 42, the holding tank dispensing pump 47 and the mixture feed valve 48 are all electrically coupled to the control panel 14, e.g., the system control panel, to facilitate automated control thereof. These components, along with an additive/treating composition pump 56, form part of a novel treatment system 64 of the present invention.

When the holding tank supply valve 44 is open and the mixture feed valve 48 is closed, and the storage pump 42 is operated, the fluid contained within the washing machine 2 is fed into the treatment holding tank 46 for temporary storage and subsequent use. When the mixture feed valve 48, located along the mixture feed line 50, is opened and the holding tank dispensing pump 47 is activated, the homogeneous treatment mixture flows from the treatment holding tank 46 into the washing machine 2.

It is to be noted that one or more of the above disclosed valves may, if desired, be replaced with a corresponding pump and one or more of the disclosed pumps may be replaced by a corresponding valve, without departing from the spirit and scope of the disclosure. The most important aspect is that there is some controllable device, coupled to the control panel 14 which facilitates regulation of the flow of fluid along the associated flow path.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a imitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

Although operations are depicted in the drawings in a particular order, this should not be understood as requiring that such operations be performed in the particular order shown or in sequential order, or that all illustrated operations be performed, to achieve desirable results.

I claim:

1. A washing machine comprising:
   a rotatable drum being located within a wash chamber for containing laundry/garments to be washed;
   a soap/laundry detergent dispenser for dispensing soap/laundry detergent into the wash chamber for washing the laundry/garments;
   a water supply flow valve for controlling a flow of water from a water source to the wash chamber for washing the laundry/garments;
   an ozone generator for supplying ozone to the water to assist with cleaning of the laundry/garments; and
   a control panel for controlling operation of at least the rotatable drum, the soap/laundry detergent dispenser, the water supply flow valve, and the ozone generator; wherein the washing machine further comprises a laundry/garment treatment system which comprises:
   an additive/treating composition supply line, connected with a source of an additive/treating composition to be added to the washing machine, for supplying the additive/treating composition from the source of the additive/treating composition to the washing machine, without any laundry/garments contained within the washing machine, and, follow supplying thereof to the washing machine, the additive/treating composition being diluted and mixed with water supplied from the water source to form of a treatment mixture;
   a storage pump connected to the washing machine for pumping the treatment mixture into a treatment holding tank for temporary storage; and
   a mixture feed valve connected to the treatment holding tank for controlling a flow of the treatment mixture, following washing of the laundry/garments, from the treatment holding tank back into the washing machine for treating the washed laundry/garments with the treatment mixture.

2. The washing machine according to claim 1, wherein a drainage line is connected to a lower region of the washing machine to facilitate removing fluid from the washing machine, a drainage flow valve is located along the drainage line for controlling the flow of the fluid from the washing machine to a drainage system, and the drainage flow valve is electrically coupled to the control panel to facilitate automated control thereof.

3. The washing machine according to claim 1, wherein a first T-connection is located along a drainage line, between the washing machine and a drainage flow valve, and an outlet of the first T-connection is coupled to a circulating pump which pumps the pumped fluid back toward the washing machine, a circulating pump flow valve controls the flow of fluid along a fluid return line back to the washing machine, and both the circulating pump and the circulating pump flow valve are electrically coupled to the control panel to facilitate automated control thereof.

4. The washing machine according to claim 3, wherein a second T-connection is located along the drainage line and an outlet from the second T-connection is coupled to the storage pump which is connected to the treatment holding tank, located at a height vertically above a height of the washing machine, for pumping the treatment mixture to the treatment holding tank.

5. The washing machine according to claim 3, wherein a static mixer is located along the fluid return line for mixing the fluid flowing along the fluid return line without any moving component.

6. The washing machine according to claim 5, wherein a venturi is located along the fluid return line, immediately before and upstream of the static mixer, and a throat of the venturi is connected to the ozone generator so that ozone is supplied to the fluid which flows through the venturi.

7. The washing machine according to claim 6, wherein the ozone is continuously produced during operation of the washing machine, and the produced ozone is only withdrawn from the ozone generator when the fluid flows through the venturi, and the ozone generator is electrically connected to the control panel to facilitate both control and interruption of the ozone generator.

8. The washing machine according to claim 1, wherein the soap/laundry detergent dispenser includes a soap/laundry detergent dispensing pump which is electrically coupled to the control panel to facilitate automated dispensing of the soap/laundry detergent into the washing machine, when required.

9. The washing machine according to claim 1, wherein a water supply line is connected to the washing machine to facilitate adding water to the washing machine, and the water supply flow valve is located along the water supply line to control the flow of water being supplied to the washing machine from the water source, and operation of the water flow valve is controlled by the control panel to facilitate automated control of water flowing into the washing machine.

10. The washing machine according to claim 1, wherein the wash chamber of the washing machine has a plurality of different water filling levels which can be automatically selected by the control panel during use of the washing machine.

11. The washing machine according to claim 1, wherein the treatment holding tank has an overflow outlet which permits excess fluid, which may be supplied to the treatment holding tank, to escape and flow out of the treatment holding tank into a fluid overflow conduit which is connected with the drainage system so as to avoid at least one of over filling or over pressurization of the treatment holding tank.

12. The washing machine according to claim 1, wherein the treatment holding tank is provided with a fluid level indicator which indicates a current level of the treatment mixture which is contained within the treatment holding tank.

13. The washing machine according to claim 12, wherein the fluid level indicator is one of a visual or a sight indicator, an internal float valve which floats on a top surface of the treatment mixture contained within the treatment holding tank and is electrically coupled to the control panel, or a low fluid level sensor which indicates when the treatment mixture in the treatment holding tank is sufficiently low to warrant replenishment and is electrically coupled to the control panel.

14. The washing machine according to claim 1, wherein the washing machine further comprises a drier for curing the treatment mixture applied to the washed laundry/garments, following removal of the washed laundry/garments from the washing machine.

15. A method of treating washed laundry/garments with a treatment mixture, the method comprising:
    providing a wash chamber, containing a rotatable drum, for washing the laundry/garments to be washed;
    providing a soap/laundry dispenser for dispensing soap/laundry detergent into the wash chamber for washing the laundry/garments to be washed;
    connecting a water supply flow valve to the wash chamber for controlling flow of water from a water source thereto;
    connecting an ozone generator to the washing machine for supplying ozone thereto, during operation of the washing machine;
    controlling operation of at least the rotatable drum, the soap/laundry dispenser, the water supply flow valve, and the ozone generator via a control panel;
    connecting an additive/treating composition supply line to a source of an additive/treating composition to be added to the washing machine and supplying the additive/treating composition to the washing machine, without any laundry/garments being contained within the washing machine;
    diluting and mixing the additive/treating composition with water supplied by the water source to form of a treatment mixture;
    pumping the treatment mixture from the washing machine into a treatment holding tank for temporary storage;
    following washing of the laundry/garments, supplying the treatment mixture from the treatment holding tank to the washing machine to treat the washed laundry/garments; and
    following treatment of the washed laundry/garments with the treatment mixture, pumping any remaining treatment mixture from the washing machine back into the treatment holding tank for temporary storage and subsequent reuse of the treatment mixture.

16. The method of treated washed laundry/garments with the treatment mixture according to claim 15, further comprising, following treatment of the washed laundry/garments with the treatment mixture:
    removing the washed and treated laundry/garments from the washing machine; and
    drying the washed and treated laundry/garments in a drier to cure the treatment mixture to the laundry/garments.

17. The method of treated washed laundry/garments with the treatment mixture according to claim 15, further comprising, when a volume of the treatment mixture contained in the treatment holding tank is low, replenishing treatment mixture by:
    supplying a desired quantity/volume of the additive/treating composition into the wash chamber;
    supplying a desired quantity/volume of water from the water source into the wash chamber to achieve a desired dilution ratio;
    mixing the additive/treating composition with the water; and
    pumping the treatment mixture from the washing machine into the treatment holding tank for temporary storage and subsequent use.

18. The method of treated washed laundry/garments with the treatment mixture according to claim 15, further comprising, once the laundry/garments are washed:
    opening a mixture feed valve, which is located along the mixture feed line, between the treatment holding tank and the wash chamber, to supply the treatment mixture to the washing machine to treat the washed laundry/garments with the treatment mixture;
    operating the washing machine to apply the treatment mixture to the washed laundry/garments; and
    following treatment of the washed laundry/garments with the treatment mixture, pumping any remaining treatment mixture, contained within the washing machine, back into the treatment holding tank for temporary storage and subsequent reuse.

19. The method of treated washed laundry/garments with the treatment mixture according to claim 18, further comprising, following treatment of the washed laundry/garments with the treatment mixture:
    removing the washed and treated laundry/garments from the washing machine; and
    drying the washed and treated laundry/garments in a drier to cure the treatment mixture to the laundry/garments.

20. The method of treated washed laundry/garments with the treatment mixture according to claim 19, further comprising:
    removing the treated laundry/garments from the washing machine and placing each piece of the treated laundry/garment on a hanger;
    drying the treated laundry/garment on the hanger a tunnel drier, which is heated to a temperature of between 230° F. and 280° F., to cure the treated laundry/garments; and
    laser printing on the cured and treated laundry/garments.

* * * * *